United States Patent
Kim et al.

(10) Patent No.: US 10,409,523 B1
(45) Date of Patent: Sep. 10, 2019

(54) STORAGE DEVICE MONITORING USING AUGMENTED REALITY

(71) Applicant: EMC IP Holding Company LLC, Hopkinton, MA (US)

(72) Inventors: Ken Kim, Worcester, MA (US); Muzhar Khokhar, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/664,526

(22) Filed: Jul. 31, 2017

(51) Int. Cl.
| | | |
|---|---|---|
| *G06T 1/20* | (2006.01) |
| *G06T 1/60* | (2006.01) |
| *G06F 3/14* | (2006.01) |
| *G09G 5/36* | (2006.01) |
| *G06F 3/06* | (2006.01) |
| *G06T 19/00* | (2011.01) |

(52) U.S. Cl.
CPC .......... *G06F 3/0653* (2013.01); *G06F 3/0619* (2013.01); *G06F 3/0683* (2013.01); *G06T 1/60* (2013.01); *G06T 19/006* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06F 2212/7211; G06F 3/0616; G06F 2212/1036; G06F 3/0649; G06F 2212/1032; G06F 2212/7204; G06F 11/00; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 5,956,665 A | 9/1999 | Martinez et al. |
| 6,384,842 B1 | 5/2002 | Dekoning et al. |
| 7,322,010 B1 | 1/2008 | Mikula |
| 7,447,807 B1 * | 11/2008 | Merry ................... | G06F 3/0604 710/36 |
| 9,959,190 B2 | 5/2018 | Klein et al. |
| 2005/0090911 A1 | 4/2005 | Ingargiola et al. |
| 2006/0095662 A1 | 5/2006 | Arnott |

(Continued)

OTHER PUBLICATIONS

"Monitoring Media Wearout Levels of Intel Solid-State Drives," Intel Corporation, 2011, 2 pages.

*Primary Examiner* — Todd Buttram
(74) *Attorney, Agent, or Firm* — Ryan, Mason & Lewis, LLP

(57) ABSTRACT

Wear-related information is obtained from one or more storage devices in a storage array system being monitored. One or more graphics representing at least a portion of the wear-related information are generated. The one or more graphics are overlaid onto a real-world view of the one or more storage devices of the storage array system being monitored to generate an augmented reality view illustrating the wear-related information for the one or more storage devices of the storage array system being monitored. The augmented reality view may be presented on a user device. In one example, the wear-related information comprises estimated EOL computations for each of the one or more storage devices.

20 Claims, 4 Drawing Sheets

(56) References Cited

U.S. PATENT DOCUMENTS

| | | | |
|---|---|---|---|
| 2008/0040522 A1* | 2/2008 | Matthews | G06F 3/023 |
| | | | 710/107 |
| 2009/0003353 A1 | 1/2009 | Ding et al. | |
| 2009/0249213 A1* | 10/2009 | Murase | H04L 41/12 |
| | | | 715/735 |
| 2010/0317420 A1 | 6/2010 | Hoffberg | |
| 2010/0191908 A1* | 7/2010 | Yamakawa | G06F 3/0605 |
| | | | 711/114 |
| 2011/0115816 A1* | 5/2011 | Brackney | G06Q 10/06 |
| | | | 345/629 |
| 2011/0310120 A1 | 12/2011 | Narayanan | |
| 2012/0090004 A1* | 4/2012 | Jeong | H04N 5/44513 |
| | | | 725/39 |
| 2012/0311260 A1* | 12/2012 | Yamagiwa | H04L 41/085 |
| | | | 711/117 |
| 2013/0031202 A1* | 1/2013 | Mick | G06Q 10/06 |
| | | | 709/217 |
| 2013/0114100 A1* | 5/2013 | Torii | G06F 11/0733 |
| | | | 358/1.14 |
| 2014/0025414 A1 | 1/2014 | Worden et al. | |
| 2014/0173474 A1 | 6/2014 | Klemenz et al. | |
| 2016/0196584 A1 | 7/2016 | Franklin et al. | |
| 2017/0017617 A1 | 1/2017 | Sato et al. | |
| 2017/0228161 A1* | 8/2017 | Nangoh | G06F 3/0604 |
| 2017/0285943 A1* | 10/2017 | Dalmatov | G06F 3/061 |
| 2017/0285972 A1* | 10/2017 | Dalmatov | G06F 3/0616 |
| 2017/0288945 A1 | 10/2017 | Chandangoudar | |
| 2018/0018822 A1* | 1/2018 | Zagrebin | G06F 3/0605 |
| 2018/0035606 A1 | 2/2018 | Burdoucci | |
| 2018/0158209 A1 | 6/2018 | Fine et al. | |
| 2018/0239991 A1 | 8/2018 | Weller et al. | |

* cited by examiner

STORAGE DEVICE MONITORING USING AUGMENTED REALITY

FIELD

The field relates generally to information processing systems, and more particularly to storage device monitoring techniques associated with such systems.

BACKGROUND

Maintenance and support for systems such as data storage systems (e.g., storage array system) often requires human observation of the state of system resources such as central processing unit (CPU) usage, memory foot print, network traffic, system temperature, solid-state disk (SSD) wear, hard disk drive (HDD) wear, and other system components and conditions. Resolution of anomalous conditions requires human intervention, and this intervention effort can range from fairly simple steps to very involved and complicated processes.

Even with the processes that involve only simple steps, simple mistakes in carrying out the processes can lead to expensive downtime for the system and, in the worst cases, can lead to customer data loss. This intervention effort starts with awareness that there is an anomalous condition with the storage array that adversely affects its ability to accomplish its primary functions. The current state of the storage array's ability to accomplish its primary functions is referred to as its "system health." Existing techniques for monitoring system health, particularly in the case of storage array systems, pose many challenges.

For example, in a storage array system with storage devices such as SSDs and HDDS, maintenance typically requires human intervention in the form of observing disk end-of-life (EOL) estimation changes. As is known, SSDs and HDDs have finite operational life spans due to wear which needs to be estimated and monitored. The human intervention requires a consistent monitoring of disk statistics and usage measurements. This task is challenging, especially in storage arrays with large numbers of SSDs and HDDs.

SUMMARY

Embodiments of the invention provide storage device monitoring techniques using augmented reality functionalities. One or more such techniques can be applied to system health awareness with respect to, but not limited to, data storage systems such as storage array systems.

For example, in one embodiment, a method comprises the following steps. Wear-related information is obtained from one or more storage devices in a storage array system being monitored. One or more graphics representing at least a portion of the wear-related information are generated. The one or more graphics are overlaid onto a real-world view of the one or more storage devices of the storage array system being monitored to generate an augmented reality view illustrating the wear-related information for the one or more storage devices of the storage array system being monitored. In one or more illustrative embodiments, the augmented reality view is presented on a user device.

Additional embodiments perform one or more of the above steps in accordance with an apparatus or system comprising a processor and memory, and in accordance with an article of manufacture or computer program product.

Advantageously, illustrative embodiments provide technique for creating an augmented reality with a visual, graphical overlay of digital information and process guidance in real-time over the physical view of one or more storage devices (e.g., SSDs, HDDs, etc.) of a storage array system being monitored. In one example, the wear-related information comprises estimated EOL computations for each of the one or more storage devices.

These and other features and advantages of the invention will become more readily apparent from the accompanying drawings and the following detailed description.

DETAILED DESCRIPTION

Figure 1:
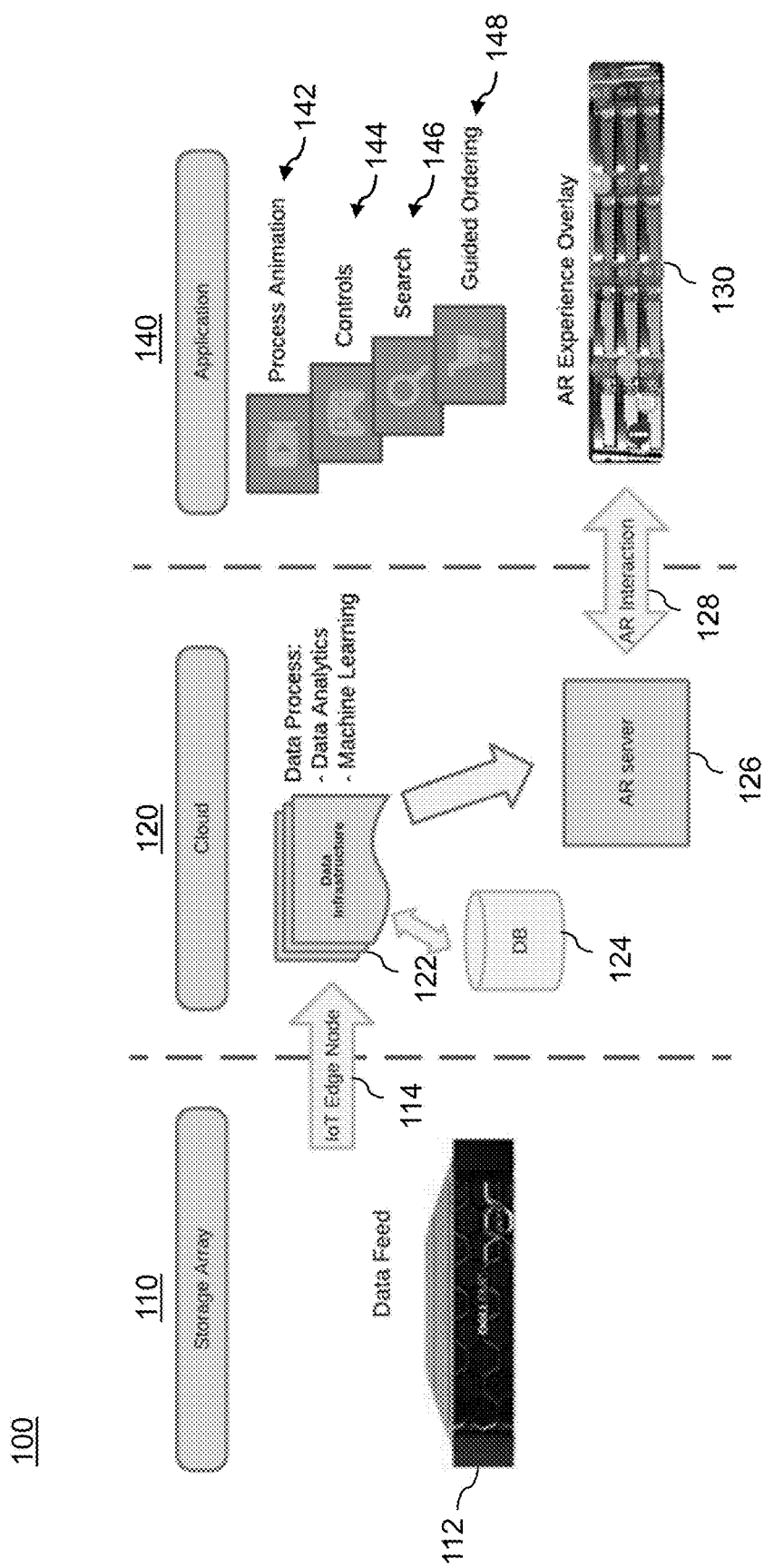
FIG. 1 illustrates a data storage system environment with augmented reality functionalities for storage device end-of-life estimation monitoring in a storage array, according to an illustrative embodiment.

Illustrative embodiments will be described herein with reference to exemplary data storage systems and associated host devices, storage devices and other processing devices. It is to be appreciated, however, that embodiments are not restricted to use with the particular illustrative system and device configurations shown. As used herein, a storage array system is one example of a data storage system, and a data storage system is one example of an information processing system. Thus, embodiments apply to all of these systems, as well as any other system that would benefit from the disclosed techniques.

More particularly, illustrative embodiments provide system health awareness techniques using augmented reality functionalities, and in particular, storage device end-of-life (EOL) monitoring. "Augmented reality" (AR), as used herein, is a computer graphics-based technology that superimposes or overlays one or more computer-generated graphics (e.g., image, text, etc.) or one or more computer-generated videos (e.g., sequence of graphics, animation, etc.) on a user's view of the real world such as a photo, image, video or the like, of an actual item, scene, or person (whether it is a real time view or a previously stored view). The augmented photo, image or video is considered a composite view (i.e., computer-generated graphic plus the real world view).

Before describing illustrative embodiments in detail below, some drawbacks associated with the existing approach to storage device EOL monitoring will be described.

As mentioned above in the background, existing approaches require human intervention to consistently monitor disk statistics and usage measurements for all storage devices in a system. In order to plan and schedule storage device replacement ahead of time (e.g., before an SSD or a HDD reaches the disk end of life), it is realized that it is important to monitor every device in the same storage pool binding by a single point of view since disk's EOL estimation (remaining days until EOL) in the same redundant array of independent disks (RAID) group should decrease evenly in same trending manner. As such, the replacement should be done as a whole. However, existing monitoring approaches cannot accomplish this effectively.

Some storage array systems provide a disk command line interface (CLI) that reports each disk's EOL estimation, which is a per disk scope calculation of the current trending of disk usage measured by the disk statistics attribute value changes. However, accuracy of disk scope calculation may vary and can be inaccurate depending on the storage pool configuration, random usage trend changes, and disk self-monitoring, analysis and reporting technology (SMART) error rate.

Better EOL estimation calculation should be beyond disk scope and take all disk related variables in a storage array configuration and historical habitat patterns against disk access into consideration. However, existing approaches have many limitations, by way of example:

(i) Current disk EOL estimation calculation uses disk scope SMART attribute values collected as a snapshot of the moment. As such, the outcome of the calculation is a linear trending calculation of the moment.

(ii) No consideration of pool configuration types. Different RAID types have different disk consumption patterns but the existing approach is not influenced by RAID group types.

(iii) No consideration of input/output (IO) and disk access flow changes. Instant calculations do not reflect IO trend changes over the time.

(iv) Not valid when disk fault occurs. It is realized that EOL prediction should also monitor disk error population and detect a near disk fault condition. Existing approaches do not perform such monitoring or detection.

Illustrative embodiments overcome the above and other drawbacks associated with existing approaches by utilizing augmented reality functionalities to enhance the storage array health awareness process, particularly for storage device (EOL estimation) monitoring, in a way that provides a more robust, real-time, error free experience for personnel. As will be illustratively explained below, such improved storage device monitoring is accomplished by using historical storage array management data and disk statistics over time, and utilizing data analytics processing that enhances disk EOL estimation with a next level of prediction calculation model executing in a machine learning-based data infrastructure.

FIG. 1 illustrates a data storage system environment 100 with system health awareness utilizing augmented reality functionalities for storage device EOL estimation in a storage array, according to an illustrative embodiment. As mentioned above, while illustrative embodiments are described from the perspective of a storage array, it is to be understood that system health awareness embodiments are not limited to implementation with a storage array system or even more generally a data storage system, but are applicable to any system that would benefit from the disclosed functionalities.

As shown in data storage system environment 100, a storage array system 110 comprises a plurality of storage arrays including storage array 112. A storage array is a data storage system that is used for object, block and/or file-based storage. The storage array typically includes storage devices in the form of HDDs and/or SSDs. HDDs are typically used for storage area networks (SANs) or network attached storage (NAS), while SSDs are comprised of flash memory devices designed to overcome performance limitations of mechanical, spinning disk drives such as HDDs. Storage arrays can be all-SSDs, all-HDDs or some combination of both types of storage media.

In an illustrative embodiment, Internet of Things (IoT) endpoints are added to the base storage array system. In one example, an IoT endpoint is a device or module (e.g., hardware, software, or some combination thereof) with a lightweight computing and storage profile that is intended to reside in or on a system being monitored, enabling the system to connect to a communication network via the IoT endpoint. As shown in FIG. 1 with regard to storage array 112, IoT edge node 114 represents an IoT endpoint.

More specifically, IoT edge node 114 provides a data feed (e.g., one or more IoT data streams) for use by the augmented reality functionalities described below. The data streams can be communicated over a communication network (e.g., public such as the Internet, private, or some combination thereof). The data streams are sourced by the self-awareness systems installed in the storage array and may be adapted by the IoT endpoints (e.g., IoT edge node 114) to provide low level and AR-focused embellished data such as storage device EOL estimation data. In illustrative embodiments, the IoT endpoint may comprise one or more algorithms for machine learning (ML) or artificial intelligence (AI) processing to enrich the data stream on-the-fly before the endpoint moves the data stream to the other end of the data pipeline. Examples of self-awareness systems installed in the storage array that provide state information may include, but are not limited to, self-test software and/or circuitry, built-in test firmware, any statistic or other performance metric monitoring and reporting systems in or on the components of the storage array. One example of a self-awareness system for SSDs and HDDs is self-monitoring, analysis and reporting technology (SMART).

As further shown in the illustrative embodiment of FIG. 1, cloud-based management system 120 receives the IoT endpoint data streams (e.g., data feed from IoT edge node 114). The cloud-based management system 120 comprises data infrastructure 122 that is configured to execute data processes such as, but not limited to, one or more ML or AI algorithms and/or analytics to provide enhanced understanding and interpretations of the storage array state, i.e., the storage device EOL estimation data reported from each SSD and HDD in the storage array 112. These interpretations can include analytics directly against the raw data as well as incorporate corporate knowledge bases to further analyze storage array state and conditions. By way of example only, such algorithms and analytics may comprise logistics regression to predict potential fault areas, decision trees for fault isolation, etc. Both raw and processed data can be stored in cloud storage database (DB) 124. The cloud-based management system 120 then provides the processed and refined information to augmented reality server 126. The processed and refined information includes EOL estimation statistics for storage devices (e.g., SSDs and HDDs) in storage array 112.

In accordance with illustrative embodiments, the AR server 126 transforms the storage device statistics into digitized graphical representations that are overlaid over the physical view of the storage devices in storage array 112 and presented as part of AR interaction 128. This AR experience overlay is denoted as 130 in FIG. 1. In illustrative embodiments, this overlay of digital information is performed in real time with respect to the current view the personnel have of the physical storage array, and re-orients itself dynamically and accurately as the user's view changes. An example of an AR experience overlay 130 superimposed on an actual real-world view of the storage devices of storage array 112 is described below in the context of FIG. 2. The overlay 130 forms a storage device EOL estimation gauge.

It is to be understood that the personnel using this AR experience overlay 130 is an information technology (IT) technician, administrator, or other troubleshooting personnel. In an illustrative embodiment, it is assumed that the technician is using a mobile device such as, but not limited to, a smart phone, tablet, laptop, or a wearable computer display device with smart glasses with a heads-up display (HUD). Each of these mobile devices have processing and storage capacity along with a camera function. The technician takes a photo or video of the storage devices of the storage array 112 which becomes the real-world view of the storage devices of the storage array upon which the AR overlay is superimposed.

Thus, in one illustrative embodiment, the technician's mobile device executes one or more processes, denoted in FIG. 1 as application 140. The mobile device configured with application 140 may be considered an AR-enabled device. The AR-enabled device can be connected wirelessly or otherwise to the AR server 126 to provide real-time feedback on features such as view angle, global positioning system (GPS) coordinates, marker and/or object recognition, and AR experience overlay on the physical view.

More particularly, the application 140 comprises functionalities including, but not limited to, process animation 142, controls 144, search process 146 and guided ordering 148. In an illustrative embodiment, process animation 142 is configured to determine the applicable sequence to play in the augment experience based on the reality and/or user interaction. Controls 144 may comprise augmented data and controls widgets to show in the augmented experience. Search 146 provides a search function to the user of the application 140. Guided ordering 148 is configured to provide an ordering interface so users can directly order the components (e.g., HDDs, SSDs, etc.) of the system being monitored without having to lookup part numbers, etc.

Accordingly, in one illustrative embodiment, the AR-enabled mobile device with a camera function and running application 140 captures an image, sends the image to the AR server 126, which then augments the image with the graphics as described herein. There are various methods that can be utilized to place the augmented data (i.e., graphics overlay 130) on the reality (i.e., real-world image and/or camera view, etc.), depending on the specific system being monitored and the corresponding needs of the troubleshooting personnel. Thus, for example, the augmented experience may comprise placing the data on the reality and/or blending trained three-dimensional (3D) images/Computer-Aided Design (CAD)/videos.

In order for the AR server 126 to know where to overlay the graphics onto the real-world image, a tagging method may be used in an illustrative embodiment. For example, a barcode (or some other identifier) is placed at a specific location on the target (in this case, the storage array 112 and its storage devices) and a trained 3D CAD drawing is aligned to the target. Thus, when the system detects the barcode, the system knows the accurate locations to place the superimposed data and/or enhanced augmented experience. In an alternative embodiment, the system can use advanced image recognition to learn the specific environment, and then superimpose the augmented data/experience over the learned environment. Still further, in additional illustrative embodiments, the system may use a global positioning system (GPS), accelerometer, gyroscope and/or other sensors in the AR-enabled user device and/or the target (e.g., storage array 112) to learn the location of components in the target and the direction the camera is pointing in order to obtain an accurate indication as to where to overlay the graphics.

In an alternative embodiment, the AR server 126 may pre-store training images of the storage array taken from different angles and then match one of those prestored training images to captured images that the mobile device sends in real time.

It is to be further appreciated that the overlay 130 may be generated and superimposed on the real-world view in the AR server 126, the AR-enabled user device running application 140, some combination thereof, or at another computing device (e.g., part of cloud infrastructure).

Figure 2:
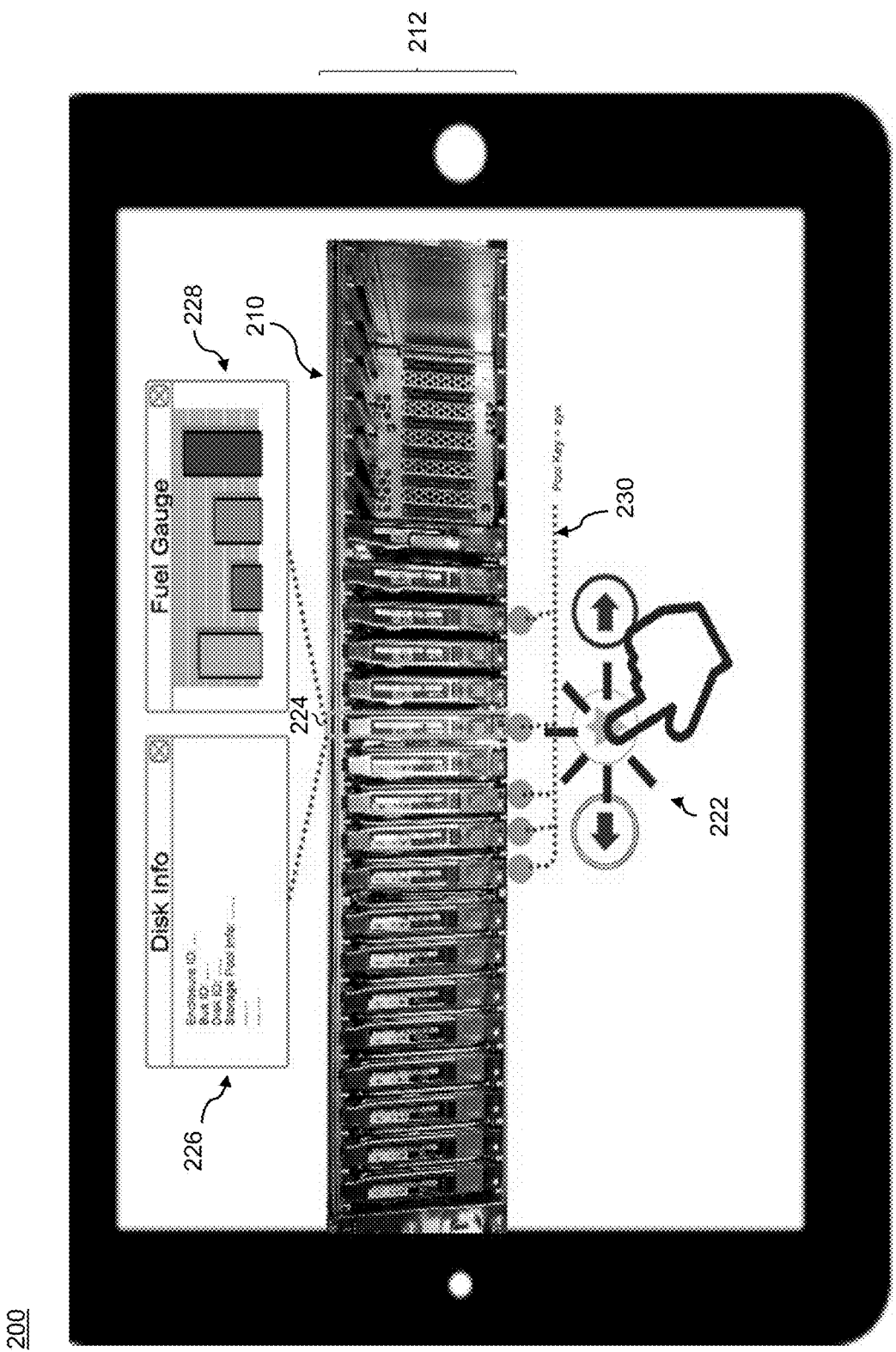
FIG. 2 illustrates an example of a presentation with an augmented reality overlay for storage device end-of-life estimation monitoring in a storage array, according to an illustrative embodiment.

FIG. 2 illustrates an example of a presentation with an augmented reality overlay for storage device EOL estimation monitoring in a storage array, according to an illustrative embodiment. The presentation may be considered a storage device EOL estimation gauge.

More particularly, presentation 200 in FIG. 2 may be considered an example of AR experience overlay 130 (FIG. 1) superimposed on a real-world image. That is, as shown in FIG. 2, an image 210 of the front of a storage array (e.g., storage array 112) is captured by the IT technician using the camera function of the AR-enabled device (e.g., mobile device running application 140). The image 210 can be captured in real-time during the troubleshooting or maintenance session or obtained from storage having been previously captured.

In this exemplary view of part of storage array 112, image 210 illustrates a set of vertically-installed SSDs 212. However, images of other storage devices (e.g., HDDs, or both SSDs and HDDs) with superimposed overlays are contemplated. Of course, this is just an example, and the AR techniques described herein can be applied to any configuration or system. As illustrated, the image 210 comprises a plurality of graphics that are superimposed over the image 210. While embodiments are not limited to any specific graphic, the plurality of graphics 222, 224, 226, 228 and 230 represent the following SSD monitoring features.

Graphic 222 is a disk iteration graphical user interface (GUI). The animated hand denotes human interaction for selecting which SSD (among SSDs 212) to display disk information (graphic 226) and fuel gauge (graphic 228). The selected SSD is highlighted by a box (graphic 224). The left and right arrows allow the user to cycle sequentially through the SSDs 212 to select any SSD in the storage array. When the box 224 is over the desired SSD, the user selects the center arrow, thus activating display of the disk information (graphic 226) and fuel gauge (graphic 228) for that SSD.

Note also that graphic 230 includes dotted lines indicating to the user which SSDs belong to the same storage pool or the same RAID type. In the example in FIG. 2, five SSDs (denoted by circles under the five SSDs connected by the dotted line in graphic 230) are part of the same storage pool (e.g., pool key zyx).

Graphic 226 provides disk information including, but not limited to, specific identifying data for the selected SSD (e.g., enclosure ID, bus ID, disk ID, storage pool information, etc.).

Graphic 228 is a so-called fuel gauge for the selected SSD (e.g., analogizing the operational life remaining for the SSD to fuel remaining in a vehicle). In this example, as shown, the fuel gauge includes a bar chart illustrating current levels of a set of metrics such as, but not limited to, disk wear percentage, estimated disk EOL, power-on hours, and disk erase count. Of course, other types of information display formats and other wear-related information may be presented in graphic 228.

Other superimposed graphics may be illustrated on image 210. Note that while some of the graphics are static indicators of a particular metric, others are selectable (by touch or pointing device) and initiate some form of animation, additional information display, and/or other function.

It is to be appreciated that the overlay that is represented by the plurality of graphics 222, 224, 226, 228 and 230 can be generated at the AR server 126, at the AR-enabled device, some combination of both locations, or at a separate processing device in communication with the AR server and/or the AR-enabled device.

The enhanced storage device EOL estimation presentation shown in FIG. 2 provides many features and advantages including, but not limited to:

(i) historical pattern analysis-based disk EOL estimation;
(ii) an augmented reality monitoring view of storage device EOL with a graphical gauge presentation; and
(iii) RAID group level of wear leveling.

Figure 3:
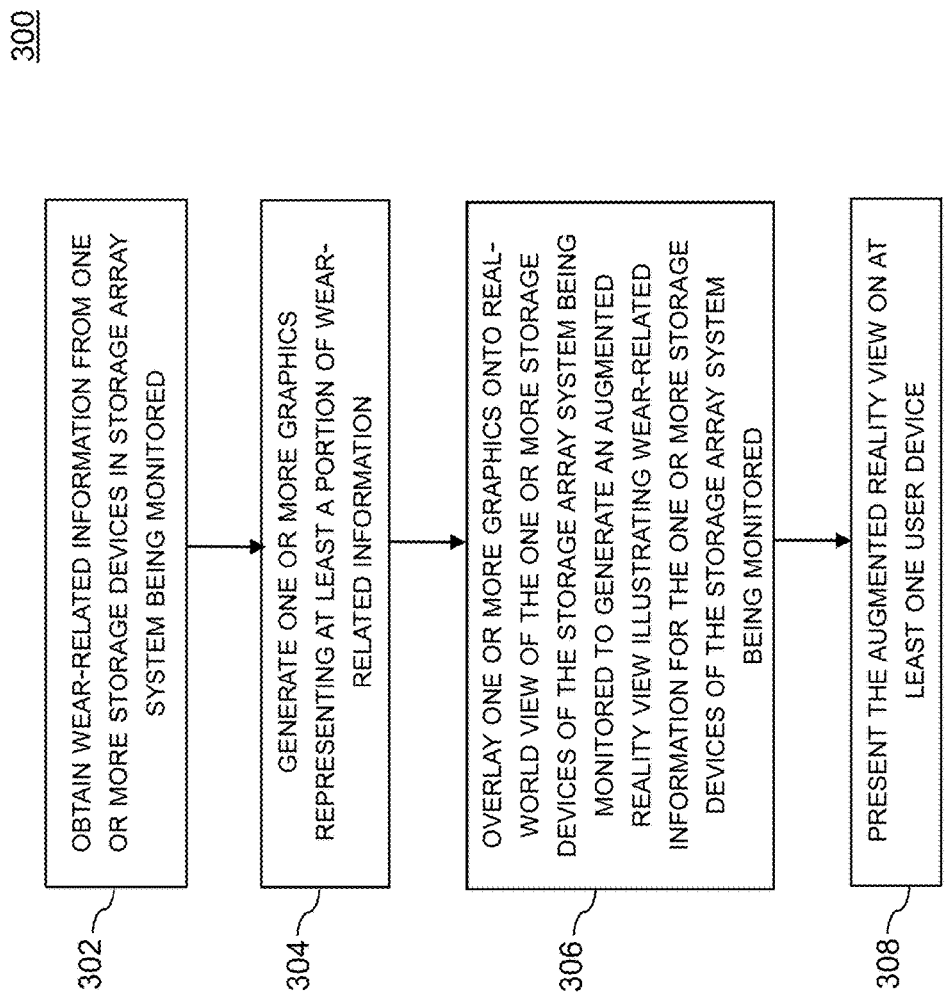
FIG. 3 illustrates a process utilizing augmented reality functionalities for storage device end-of-life estimation monitoring in a storage array, according to an illustrative embodiment.

FIG. 3 illustrates a process 300 utilizing augmented reality functionalities for storage device end-of-life estimation monitoring in a storage array, according to an illustrative embodiment.

Step 302 obtains wear-related information from one or more storage devices in a storage array system being monitored.

Step 304 generates one or more graphics representing at least a portion of the wear-related information.

Step 306 overlays the one or more graphics onto a real-world view of the one or more storage devices of the storage array system being monitored to generate an augmented reality view illustrating the wear-related information for the one or more storage devices of the storage array system being monitored.

Step 308 presents the augmented reality view on at least one user device.

Advantageously, the combination of IoT endpoints, machine learning/analytics, and AR server creates an augmented reality with a visual, graphical overlay of digital information and process guidance in real-time over the physical view of the storage array. A storage device EOL estimation gauge, and other maintenance activities, are provided as dynamic, real-time feedback to personnel.

Furthermore, the AR techniques described herein provide many advantages, examples of which comprise the following:

(i) Enhanced storage array health awareness and problem isolation including, but not limited to, facilitating: real-time health awareness information visualization; enhanced and extremely rapid problem identification and location; improved troubleshooting and problem solving; and targeted troubleshooting for specific customers and/or storage arrays.

(ii) Enhanced storage array component replacement status and system impact including, but not limited to, providing: real-time feedback on the health status impacts of on-going component repair/replacement; and expedited problem resolution by eliminating the document lookup, personnel interpretation, manual action verification aspects of problem resolution.

(iii) Enhanced storage array problem resolution verification including, but not limited to, providing real-time feedback on the health state of the system after repairs are completed.

(iv) Enhanced SSD fuel gauge view of SSD wear including, but not limited to, providing: an augmented reality monitoring view of SSD wear leveling with graphical gauge presentation; graphical view of SSD storage pool association; and redundant array of independent disks (RAID) group level of wear leveling.

(v) Enhanced SSD replacement and ordering including, but not limited to, providing: exact low capacity (e.g., wear-out level is high) SSD identification to prevent affecting the wrong disk model order; and bulk disk order suggestion and order arrangement if it sees the user selected SSD is part of a configured storage pool/RAID group and other bounded SSDs in the pool has same low capacity level.

At least portions of the techniques using augmented reality functionalities shown in FIGS. 1-3 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the techniques using augmented reality functionalities shown in FIGS. 1-3 may each run on a computer, server, storage device or other processing platform element. A given such element may be viewed as an example of what is more generally referred to herein as a "processing device." An example of such a processing platform is processing platform 400 shown in FIG. 4.

The processing platform 400 in this embodiment comprises a plurality of processing devices, denoted 402-1, 402-2, 402-3, . . . 402-N, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 4:
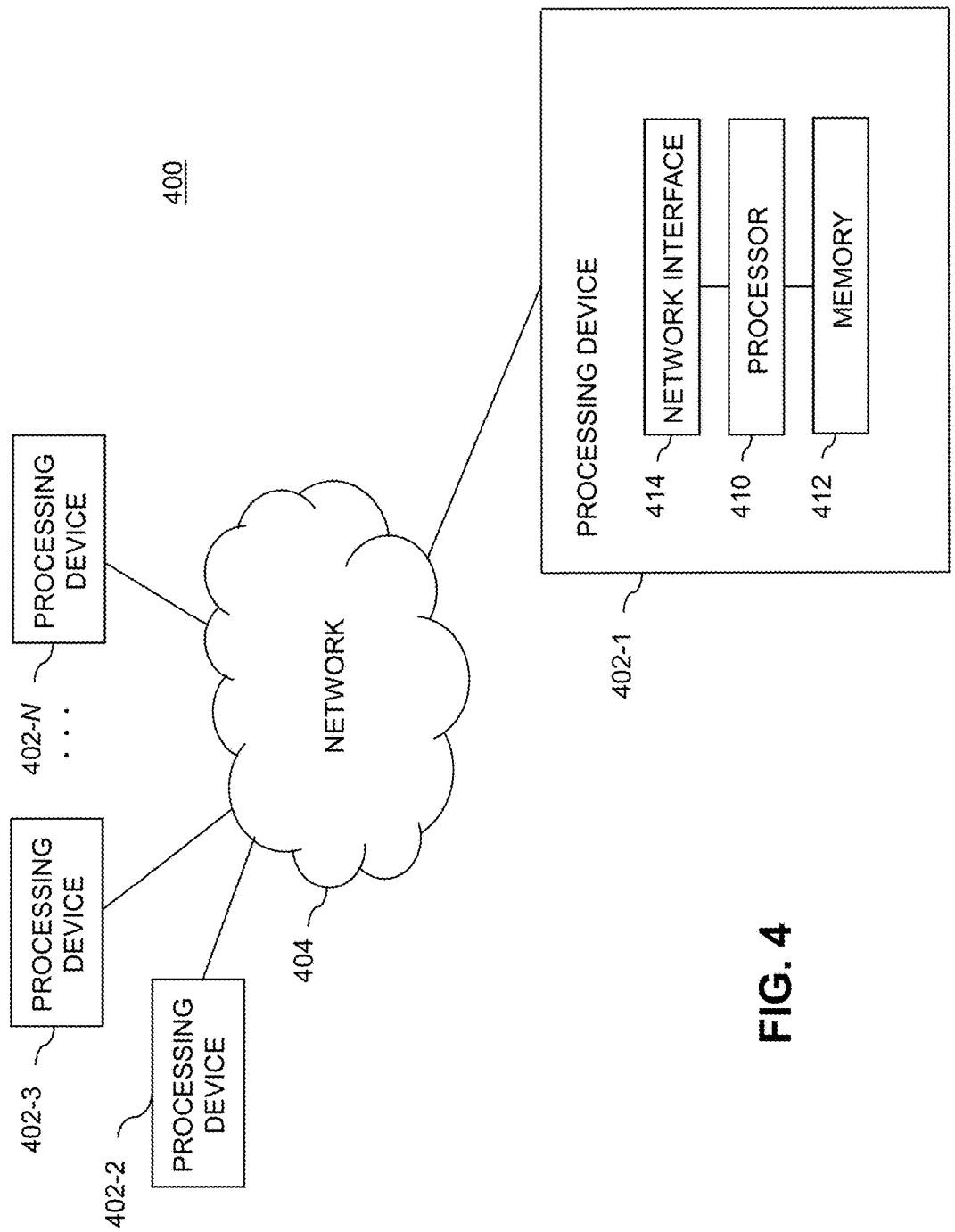
FIG. 4 illustrates a processing platform used to implement augmented reality functionalities for storage device end-of-life estimation monitoring in a storage array, according to an illustrative embodiment.

Also included in the processing device 402-1 of the example embodiment of FIG. 4 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods disclosed herein. Such components can communicate with other elements of the system over any type of network or other communication media.

As indicated previously, in some embodiments, components of the techniques using augmented reality functionalities as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:
1. A method comprising:
  obtaining wear-related information from one or more storage devices in a storage array system being monitored;
  generating one or more graphics representing at least a portion of the wear-related information;
  overlaying the one or more graphics onto a real-world view of a plurality of storage devices comprising the one or more storage devices of the storage array system being monitored to generate an augmented reality view illustrating the wear-related information for the one or more storage devices of the storage array system being monitored; and
  responsive to a selection of one of the one or more storage devices in the augmented reality view, presenting in the augmented reality view and overlaid over the real-world view, a set of graphics identifying the portions of the real-world view that contain each storage device of the plurality of storage devices that belongs to the same storage pool as the selected one of the one or more storage devices;
  wherein the above steps are executed by one or more processing devices, and wherein each processing device comprises a processor operatively coupled to a memory.
2. The method of claim 1, wherein the wear-related information from the one or more storage devices comprises an estimated end-of-life (EOL) computation for each of the one or more storage devices;

wherein the one or more graphics comprise an illustration of the estimated EOL computation for each of the one or more storage devices; and wherein the one or more graphics represent an estimated EOL gauge for each of the one or more storage devices.

3. The method of claim 1, wherein the one or more graphics comprise an illustration of the type of storage group to which each of the one or more storage devices belong.

4. The method of claim 3, wherein the type of storage group comprises a redundant array of independent disks (RAID) group type.

5. The method of claim 1, wherein the one or more graphics comprise an illustration of identifying information for each of the one or more storage devices.

6. The method of claim 1, wherein the one or more storage devices comprise one or more hard disk drives.

7. The method of claim 1, wherein the one or more storage devices comprise one or more solid-state disks.

8. The method of claim 1, further comprising presenting the augmented reality view on at least one user device.

9. An article of manufacture comprising a non-transitory processor-readable storage medium having stored therein program code of one or more software programs, wherein the program code when executed by one or more processing devices causes the one or more processing devices to:

obtain wear-related information from one or more storage devices in a storage array system being monitored;

generate one or more graphics representing at least a portion of the wear-related information;

overlay the one or more graphics onto a real-world view of a plurality of storage devices comprising the one or more storage devices of the storage array system being monitored to generate an augmented reality view illustrating the wear-related information for the one or more storage devices of the storage array system being monitored; and responsive to a selection of one of the one or more storage devices in the augmented reality view, present in the augmented reality view and overlaid over the real-world view, a set of graphics identifying the portions of the real-world view that contain each storage device of the plurality of storage devices that belongs to the same storage pool as the selected one of the one or more storage devices.

10. A system comprising:

a set of one or more processing devices, wherein each processing device comprises a processor coupled to a memory, and wherein the one or more processing devices are configured to:

obtain wear-related information from one or more storage devices in a storage array system being monitored;

generate one or more graphics representing at least a portion of the wear-related information;

overlay the one or more graphics onto a real-world view of a plurality of storage devices comprising the one or more storage devices of the storage array system being monitored to generate an augmented reality view illustrating the wear-related information for the one or more storage devices of the storage array system being monitored; and responsive to a selection of one of the one or more storage devices in the augmented reality view, present in the augmented reality view and overlaid over the real-world view, a set of graphics identifying the portions of the real-world view that contain each storage device of the plurality of storage devices that belongs to the same storage pool as the selected one of the one or more storage devices.

11. The system of claim 10, wherein the wear-related information from the one or more storage devices comprises an estimated end-of-life (EOL) computation for each of the one or more storage devices; and wherein the one or more graphics comprise an illustration of the estimated EOL computation for each of the one or more storage devices.

12. The system of claim 10, wherein the one or more graphics comprise an illustration of the type of storage group to which each of the one or more storage devices belong.

13. The system of claim 10, wherein the one or more graphics comprise an illustration of identifying information for each of the one or more storage devices.

14. The system of claim 10, wherein the set of one or more processing devices is further configured to present the augmented reality view on at least one user device.

15. The method of claim 1, wherein the set of graphics comprise a graphic presented proximate to each storage device of the plurality of storage devices that belongs to the same storage pool as the selected one of the one or more storage devices.

16. The method of claim 15, wherein the set of graphics comprise at least one connecting element connecting the graphics presented proximate to each storage device of the plurality of storage devices that belongs to the same storage pool as the selected one of the one or more storage devices.

17. The article of manufacture of claim 9, wherein the set of graphics comprise a graphic presented proximate to each storage device of the plurality of storage devices that belongs to the same storage pool as the selected one of the one or more storage devices.

18. The article of manufacture of claim 17, wherein the set of graphics comprise at least one connecting element connecting the graphics presented proximate to each storage device of the plurality of storage devices that belongs to the same storage pool as the selected one of the one or more storage devices.

19. The system of claim 10, wherein the set of graphics comprise a graphic presented proximate to each storage device of the plurality of storage devices that belongs to the same storage pool as the selected one of the one or more storage devices.

20. The system of claim 19, wherein the set of graphics comprise at least one connecting element connecting the graphics presented proximate to each storage device of the plurality of storage devices that belongs to the same storage pool as the selected one of the one or more storage devices.

\* \* \* \* \*